(12) United States Patent
Hara et al.

(10) Patent No.: US 12,479,169 B2
(45) Date of Patent: Nov. 25, 2025

(54) APPARATUS FOR MODELING THREE-DIMENSIONAL OBJECT AND METHOD FOR MODELING THREE-DIMENSIONAL OBJECT

(71) Applicants: MIMAKI ENGINEERING CO., LTD., Nagano (JP); GRAPHIC CREATION Co., Ltd., Nagano (JP)

(72) Inventors: Hirofumi Hara, Nagano (JP); Akira Ikeda, Nagano (JP)

(73) Assignees: MIMAKI ENGINEERING CO., LTD., Nagano (JP); GRAPHIC CREATION Co., Ltd., Nagano (JP)

(*) Notice: Subject to any disclaimer, the term of this patent is extended or adjusted under 35 U.S.C. 154(b) by 691 days.

(21) Appl. No.: 17/234,786

(22) Filed: Apr. 19, 2021

(65) Prior Publication Data

US 2021/0237424 A1 Aug. 5, 2021

Related U.S. Application Data

(63) Continuation of application No. 14/931,861, filed on Nov. 4, 2015, now abandoned.

(30) Foreign Application Priority Data

Nov. 11, 2014 (JP) .................................. 2014-228916

(51) Int. Cl.
*B29C 64/118* (2017.01)
*B29C 64/393* (2017.01)
(Continued)

(52) U.S. Cl.
CPC ........ *B29C 67/0007* (2013.01); *B29C 64/118* (2017.08); *B33Y 10/00* (2014.12);
(Continued)

(58) Field of Classification Search
CPC ... B29C 64/106; B29C 64/118; B29C 64/209; B29C 64/295; B29C 64/386;
(Continued)

(56) References Cited

U.S. PATENT DOCUMENTS 10,335,991 B2 * 7/2019 Mandel ................. B29C 64/393
10,870,268 B2 * 12/2020 Debora ................. B29C 64/118
(Continued)

*Primary Examiner* — Galen H Hauth
*Assistant Examiner* — Baileigh Kate Darnell
(74) *Attorney, Agent, or Firm* — JCIPRNET

(57) ABSTRACT

A method for forming a three-dimensional object by a fused deposition modeling method. The method uses a plurality of material resin supply units, each configured to supply a coloring material resin of a different color, and the coloring material resins are resins to be used as a modeling material. A mixed resin ejection unit is configured to eject a mixed resin obtained by mixing the coloring material resins supplied from the plurality of material resin supply units. The plurality of material resin supply units being configured to supply the coloring material resins of different colors to the mixed resin ejection unit. The method includes controlling the amounts of the coloring material resins to be supplied from each of the plurality of material resin supply units to the mixed resin ejection unit, thereby adjusting a color of the mixed resin that is to be ejected by the mixed resin ejection unit.

7 Claims, 1 Drawing Sheet

(51) Int. Cl.
  *B29C 67/00* (2017.01)
  *B33Y 10/00* (2015.01)
  *B33Y 30/00* (2015.01)
  *B33Y 40/10* (2020.01)
  *B33Y 50/02* (2015.01)

(52) U.S. Cl.
  CPC .............. *B33Y 30/00* (2014.12); *B33Y 40/10* (2020.01); *B33Y 50/02* (2014.12)

(58) Field of Classification Search
  CPC ....... B29C 64/393; B33Y 50/00; B33Y 50/02; B33Y 10/00; B33Y 40/10
  USPC .................. 264/40.1, 40.7, 308; 700/119
  See application file for complete search history.

(56) References Cited

U.S. PATENT DOCUMENTS

| | | | | |
|---|---|---|---|---|
| 2010/0327479 | A1* | 12/2010 | Zinniel | B29C 64/106 |
| | | | | 425/114 |
| 2013/0053995 | A1* | 2/2013 | Hashimoto | B29C 64/153 |
| | | | | 700/97 |
| 2014/0277661 | A1* | 9/2014 | Amadio | G05B 19/4099 |
| | | | | 700/119 |
| 2015/0375451 | A1* | 12/2015 | Voris | B29C 64/314 |
| | | | | 425/113 |
| 2016/0375676 | A1* | 12/2016 | Ritchie | B33Y 80/00 |
| | | | | 428/29 |
| 2018/0265685 | A1* | 9/2018 | Yuasa | C08K 7/06 |

\* cited by examiner

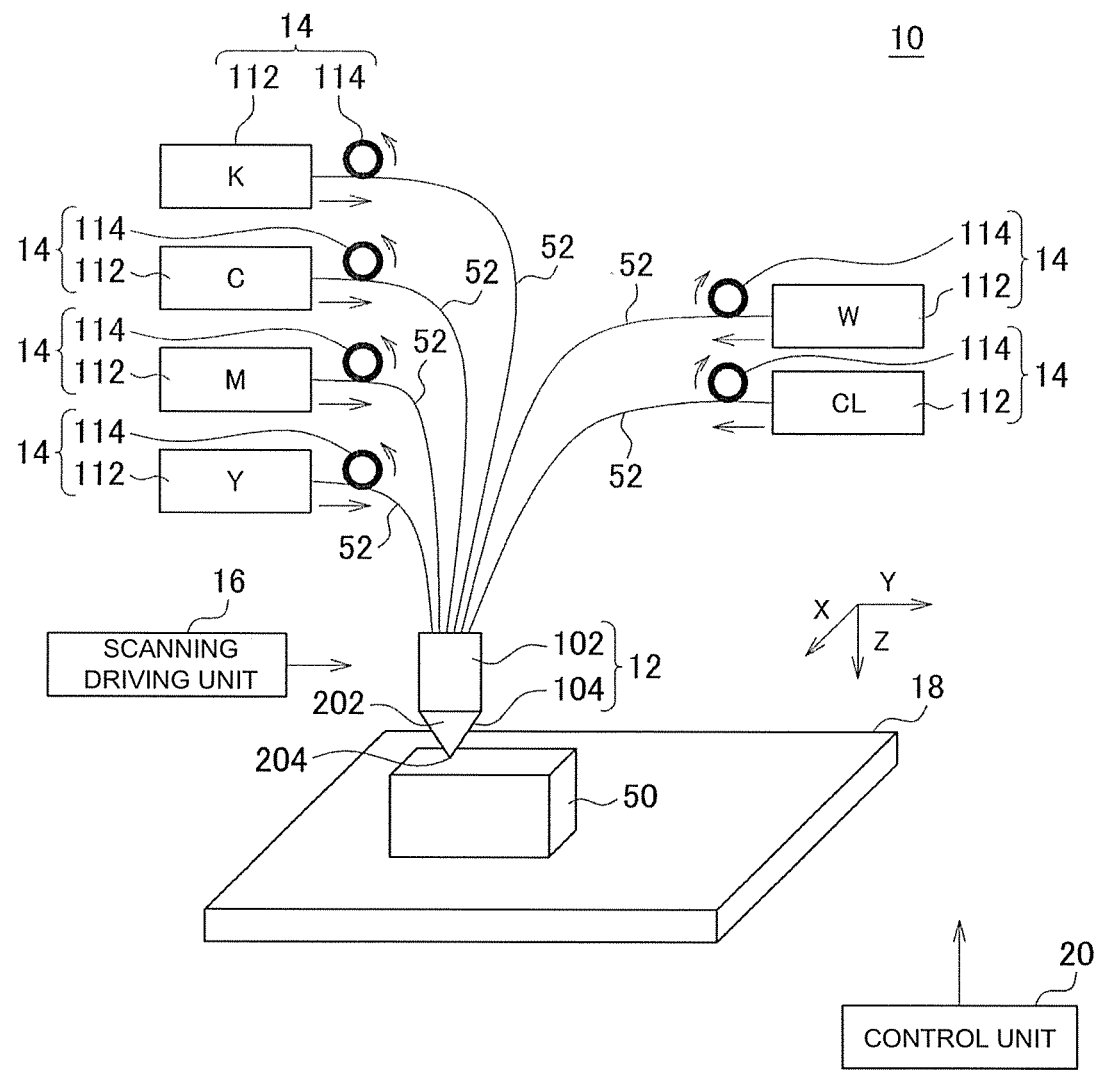

APPARATUS FOR MODELING THREE-DIMENSIONAL OBJECT AND METHOD FOR MODELING THREE-DIMENSIONAL OBJECT

CROSS-REFERENCE TO RELATED APPLICATIONS

This application is a continuation application of U.S. application Ser. No. 14/931,861, filed on Nov. 4, 2015, which claims priority from Japanese Patent Application No. 2014-228916, filed on Nov. 11, 2014, the entire contents of which are incorporated herein for all purpose by this reference.

TECHNICAL FIELD

The disclosure relates to an apparatus for modeling a three-dimensional object and a method for modeling a three-dimensional object.

DESCRIPTION OF THE BACKGROUND ART

In the related art, a method for modeling a three-dimensional object by a fused deposition modeling method (FDM) has been known (for example, refer to Patent Literature 1). The fused deposition modeling method is a modeling method developed by a Stratasys company of U.S.A. in the late 1980s, in which the modeling is performed by fusing, extruding and depositing windings of a thermoplastic resin referred to as a filament at high temperatures of about 200° C.

[Patent Literature 1]U.S. Pat. No. 8,815,141.

SUMMARY

In the related art, as the filament that is used in the fused deposition modeling method, filaments having a variety of colors are used. However, according to the fused deposition modeling method, the modeling is generally performed using only a filament of preselected one color because of a configuration of an apparatus. For this reason, when modeling a three-dimensional object for which a coloring is performed with two or more colors, it is necessary to once stop an operation of the apparatus during the modeling and to replace the filament with a filament of another color.

However, much labors and time are required to replace the filaments. Also, when replacing the filaments during the modeling, the modeling precision may be deteriorated due to the break of the operation. For this reason, when performing the modeling by the fused deposition modeling method, the colors to be colored are generally limited. As a result, when performing the modeling by the fused deposition modeling method, if a coloring is required, it is general to polish a three-dimensional object after the modeling and then to perform the coloring.

In recent years, as utilities of an apparatus (for example, 3D printer) for modeling a three-dimensional object are expanded, it is required to perform the coloring during the modeling, not after the modeling, in many cases. Regarding the utility, it is considered to perform the modeling with color inks by using inkjet heads, for example.

In this case, however, it is necessary to use a plurality of inkjet heads, each of which has a plurality of (for example, 100 or more) precise nozzles formed therein, in conformity to the number of colors to be used in the coloring. For this reason, the cost of the apparatus considerably increases, as compared to the apparatus configured to perform the modeling by the fused deposition modeling method, for example.

For this reason, a configuration capable of more appropriately modeling a colored three-dimensional object is needed. More specifically, for example, a configuration capable of more appropriately modeling a colored three-dimensional object by the fused deposition modeling method capable of performing the modeling at relatively low cost is needed. Therefore, the disclosure provides an apparatus for modeling a three-dimensional object and a method for modeling a three-dimensional object capable of solving the above problems.

The inventors first considered performing the modeling by the fused deposition modeling method by using a plurality of filaments of which colors are respectively different. Also, the inventors considered mounting a plurality of heating extrusion apparatuses configured to extrude the filaments, in conformity to the number of colors to be used, as a configuration of an apparatus for modeling a three-dimensional object.

As a result of the intensive studies, however, the inventors found that it is difficult to appropriately perform the coloring just by adopting the plurality of heating extrusion apparatuses. More specifically, for example, when the plurality of heating extrusion apparatuses is simply used, it is possible to switch the colors within a range of the number of filaments to be used. In this case, however, it is difficult to appropriately express an intermediate color obtained by mixing a plurality of colors, for example. For this reason, when expressing a variety of colors to a certain level or higher, it is required to use a very large number of filaments. In this case, the cost of the apparatus considerably increases. Also, according to this configuration, since the heating extrusion apparatus being used is replaced upon the switch of the colors, the modeling precision may be deteriorated due to a difference of ejection characteristics, for example.

Regarding this, the inventors further intensively studied and considered mixing and adjusting resins of a plurality of colors to a desired color in advance, not using the plurality of heating extrusion apparatuses, and extruding the adjusted resin to perform the modeling. According to this configuration, it is possible to more appropriately express the more diverse colors. Also, since the ejection characteristics are not changed upon the switch of the colors, the modeling precision is not deteriorated due to the switch of the colors. That is, the disclosure has following configurations.

(Configuration 1) There is provided an apparatus for modeling a three-dimensional object configured to model a three-dimensional object by a fused deposition modeling method. The apparatus includes a plurality of material resin supply units configured to supply a material resin, which is a resin to be used as a modeling material, respectively; a mixed resin ejection unit configured to eject a mixed resin, which is a resin obtained by mixing the material resins to be supplied from the plurality of material resin supply units, and a resin supply control unit configured to control amounts of the material resins to be supplied from each of the plurality of material resin supply units to the mixed resin ejection unit. The plurality of material resin supply units is configured to supply the material resins of different colors to the mixed resin ejection unit, respectively. The resin supply control unit is configured to control the amounts of the material resins to be supplied from each of the plurality of material resin supply units to the mixed resin ejection unit, thereby adjusting a color of the mixed resin that is to be ejected by the mixed resin ejection unit.

According to the above configuration, it is possible to appropriately model the three-dimensional object at low cost by performing the modeling by the fused deposition modeling method, for example. Also, it is possible to appropriately model the colored three-dimensional object by using the plurality of types of material resins of which colors are respectively different. Also, in this case, it is possible to appropriately express a variety of colors by mixing the plurality of types of material resins before the ejection, without being limited to the colors of the material resins. Also, it is possible to change the color while continuing to eject the mixed resin obtained by mixing the material resins. For this reason, the modeling precision is not deteriorated due to the switch of the colors. Therefore, according to the above configuration, it is possible to appropriately model the colored three-dimensional object at low cost.

Here, the material resin that is to be supplied by each material resin supply unit is a thread-shaped or fine line-shaped resin, for example. As the material resin, a well-known filament that is used in the fused deposition modeling method may be used. Also, regarding the operation of the mixed resin ejection unit, the description "ejection of the mixed resin" means an ejection operation that is to be performed when modeling a three-dimensional object by the fused deposition modeling method.

Also, the mixed resin ejection unit is configured to mix the material resins while heating the material resins supplied from each of the material resin supply units to about 200° C., for example. The mixed resin ejection unit is configured to eject the mixed resin obtained by the mixing from the nozzle, thereby performing the modeling by the fused deposition modeling method. As the mixed resin ejection unit, a mixing nozzle may be used, for example.

(Configuration 2) The material resin is a thermoplastic resin. The mixed resin ejection unit includes a heater unit configured to heat the material resins to be supplied from each of the material resin supply units, a resin mixing unit configured to mix the material resins heated by the heater unit, thereby generating the mixed resin, and a nozzle configured to eject the mixed resin generated at the resin mixing unit. The mixed resin ejection unit is configured to eject the mixed resin from the nozzle, thereby modeling the three-dimensional object.

According to the above configuration, it is possible to appropriately mix the material resins in the mixed resin ejection unit. Also, the mixed resin, which is obtained by the mixing with being heated, is ejected, so that it is possible to appropriately model the three-dimensional object by the mixed resin having a desired color.

(Configuration 3) The resin supply control unit is configured to control the amounts of the material resins to be supplied to the mixed resin ejection unit so that a total amount of the material resins to be supplied from the plurality of material resin supply units to the mixed resin ejection unit is matched with a preset supply amount.

According to the above configuration, it is possible to more appropriately mix the material resins in the mixed resin ejection unit, for example. Also, in this configuration, the mixed resin ejection unit is configured to eject the mixed resin from the nozzle at an ejection amount corresponding to the supplied material resins. In this case, the ejection amount from the nozzle is an ejection amount per unit time. For this reason, according to the above configuration, it is also possible to stabilize the ejection amount from the nozzle to a constant amount corresponding to the supply amounts of the material resins. Thereby, it is also possible to model the three-dimensional object with higher precision, for example.

In the meantime, when the supply amount of the material resin from any one material resin supply unit is increased, for example, the resin supply control unit decreases the supply amounts of the material resins from the other material resin supply units, in correspondence to the increase. Also, the supply amount of the material resin from any one material resin supply unit is decreased, for example, the resin supply control unit increases the supply amounts of the material resins from the other material resin supply units, in correspondence to the decrease. According to this configuration, for example, it is possible to appropriately set a total amount of the material resins to be supplied to the mixed resin ejection unit to a predetermined supply amount.

(Configuration 4) The apparatus includes the plurality of material resin supply units configured to supply the material resins of respective colors of at least yellow, magenta, cyan and black. According to this configuration, for example, it is possible to more appropriately perform the coloring with diverse colors. More specifically, in this case, it is considered to perform the full-color coloring, for example. According to this configuration, it is possible to appropriately provide an apparatus (full-color modeling machine) configured to perform a full-color modeling at low cost.

(Configuration 5) The material resin supply unit configured to supply the material resin of a white color is further provided. According to this configuration, for example, it is possible to more appropriately perform the coloring with diverse colors. The material resin of a white color may be used to express a light color, for example.

(Configuration 6) The material resin supply unit configured to supply the material resin of a clear color is further provided. According to this configuration, it is possible to further express a transparent color, in addition to the colors to be expressed by the material resins of respective colors of yellow, magenta, cyan, and black. For this reason, according to this configuration, for example, it is possible to more appropriately perform the coloring with more diverse colors.

(Configuration 7) Each of the plurality of material resin supply units has a resin extrusion device configured to extrude the material resin towards the mixed resin ejection unit by a roller. The resin supply control unit is configured to control rotation numbers of the rollers of the resin extrusion devices of the plurality of material resin supply units, thereby controlling the amounts of the material resins to be supplied from each of the plurality of material resin supply units to the mixed resin ejection unit.

According to the above configuration, for example, it is possible to more appropriately mix the material resins. Thereby, it is also possible to more appropriately model the colored three-dimensional object. Also, the resin supply control unit is configured to control the rotation numbers of the rollers of the respective resin extrusion devices, in accordance with color information indicating a color of the mixed resin to be ejected from the nozzle at each timing, for example. In this case, the resin supply control unit is configured to acquire the color information on the basis of data representing a three-dimensional object to be modeled, for example.

Also, the resin supply control unit is configured to control the rotation numbers of the rollers of the resin extrusion devices, taking into consideration a time difference between the timing at which the material resins are mixed and the timing at which the mixed resin is ejected from the nozzle. In this case, the time difference is a time difference that is to be determined depending on a capacity of the mixed resin ejection unit, for example. Also, the resin supply control unit may be configured to once stop the ejection, in conformity to the timing at which the color of the mixed resin to be ejected from the nozzle of the mixed resin ejection unit is changed, for example. By this configuration, it is possible to more appropriately change the color, for example.

(Configuration 8) There is provided a method for modeling a three-dimensional object by a fused deposition modeling method. The method uses a plurality of material resin supply units configured to supply a material resin, which is a resin to be used as a modeling material, respectively, and a mixed resin ejection unit configured to eject a mixed resin, which is a resin obtained by mixing the material resins to be supplied from the plurality of material resin supply units. The plurality of material resin supply units is configured to supply the material resins of different colors to the mixed resin ejection unit, respectively. The method includes controlling amounts of the material resins to be supplied from each of the plurality of material resin supply units to the mixed resin ejection unit, thereby adjusting a color of the mixed resin that is to be ejected by the mixed resin ejection unit. According to this configuration, it is possible to accomplish the same effects as the configuration 1, for example.

According to the disclosure, it is possible to appropriately model the colored three-dimensional object.

BRIEF DESCRIPTION OF THE DRAWINGS

FIG. 1 depicts an example of an apparatus 10 for modeling a three-dimensional object according to an illustrative embodiment of the disclosure.

DETAILED DESCRIPTION OF EMBODIMENTS

Hereinafter, an illustrative embodiment of the disclosure will be described with reference to the drawings. FIG. 1 depicts an example of an apparatus 10 for modeling a three-dimensional object according to an illustrative embodiment of the disclosure. In this illustrative embodiment, the apparatus 10 for modeling a three-dimensional object is an apparatus for modeling a three-dimensional object configured to model a three-dimensional object by a fused deposition modeling method. In this case, the fused deposition modeling method is a method of extruding resins, which are fused by the heating, from nozzles and depositing the same to model a three-dimensional object.

More specifically, the apparatus 10 for modeling a three-dimensional object is configured to perform the modeling by using a filament, which is a thread-shaped or fine line-shaped resin, as a material resin that is a resin to be used as a modeling material. Also, the apparatus 10 for modeling a three-dimensional object is configured to model a colored three-dimensional object by using a plurality of types of filaments of which colors are respectively different. Also, the apparatus 10 for modeling a three-dimensional object of this illustrative embodiment may have the same or similar features as or to a well-known apparatus configured to perform the modeling by the fused deposition modeling method, except for configurations to be described later.

Also, in this illustrative embodiment, the apparatus 10 for modeling a three-dimensional object has a plurality of material resin supply units 14, a mixed resin ejection unit 12, a scanning driving unit 16, a stand unit 18, and a control unit 20. The plurality of material resin supply units 14 is supply units configured to supply filaments 52, which are an example of the material resin. In this illustrative embodiment, each of the plurality of material resin supply units 14 is configured to supply the filaments 52 of different colors to the mixed resin ejection unit 12, respectively.

Also, more specifically, in this illustrative embodiment, the plurality of material resin supply units 14 is configured to supply the filaments 52 of respective colors of Y (yellow), M (magenta), C (cyan), K (black), W (white) and CL (clear) to the mixed resin ejection unit 12, respectively. The CL (clear) color is an achromatic transparent color. Also, the respective colors of YMCK are used as solid colors when mixing with the W color or CL color. Also, in a modified embodiment of the configuration of the apparatus 10 for modeling a three-dimensional object, a material resin supply unit 14 configured to supply a filament 52 of a color except for the above colors may be further provided. Also, a part of the material resin supply units 14 may be omitted depending on a quality required for the three-dimensional object 50. For example, the material resin supply unit 14 as regards at least one of W and CL colors may be omitted.

Also, in this illustrative embodiment, each of the material resin supply units 14 has a filament feeding unit 112 and a filament extrusion roller 114. The filament feeding unit 112 is a unit configured to sequentially feed the filament 52 in accordance with an operation of the filament extrusion roller 114. More specifically, the filament feeding unit 112 may be a holder having the filament 52 wound into a winding shape.

The filament extrusion roller 114 is an example of the resin extrusion device, and is configured to sequentially feed the filament 52 from the filament feeding unit 112 towards the mixed resin ejection unit 12 in accordance with an instruction of the control unit 20. Also, in this illustrative embodiment, the filament extrusion roller 114 has a configuration of extruding the filament 52 by a roller contacting the filament 52, is arranged at a more upstream side (primary side) on a supply path of the filament 52 than the mixed resin ejection unit 12, and is configured to sequentially feed the filament 52 towards the mixed resin ejection unit 12 by rotating the roller in a direction shown with an arrow in FIG. 1. By the above configuration, in this illustrative embodiment, each of the plurality of material resin supply units 14 extrudes the filaments 52 of respective colors towards the mixed resin ejection unit 12 in accordance with the instruction of the control unit 20, respectively.

As shown in FIG. 1, in this illustrative embodiment, each material resin supply unit 14 is configured to press the filament 52 of each color into the mixed resin ejection unit 12 through a separate path. Also, each material resin supply unit 14 preferably has a tube for passing the filament 52 towards the mixed resin ejection unit 12, for example. According to this configuration, it is possible to more appropriately supply the filament 52 through the tube.

Also, in this illustrative embodiment, the filament 52 of each color is a thermoplastic resin. As the filament 52, it is possible to favorably use a resin that is to be fused at temperatures of about 200° C., for example. Also, as the filament 52 of each color, it is possible to favorably use a well-known filament that is to be used in the fused deposition modeling method, for example.

The mixed resin ejection unit 12 is an ejection unit configured to eject the fused resin to a position at which the three-dimensional object 50 is to be formed. In this case, the position at which the three-dimensional object 50 is to be formed is a position at which the resin is to be extruded upon the modeling by the fused deposition modeling method, for example.

Also, in this illustrative embodiment, the mixed resin ejection unit 12 has a heater unit 102 and a mixing nozzle 104. The heater unit 102 is a heating unit configured to heat the filaments 52 supplied from the respective material resin supply units 14, and is configured to receive and heat the filaments 52 supplied from the plurality of material resin supply units 14, thereby fusing the respective filaments 52. In this case, the heater unit 102 is configured to heat the filaments 52 to about 200° C. (for example, about 180° C. to 250° C.), depending on the fusing temperatures of the filaments 52, for example. Also, the heater unit 102 is configured to sequentially receive the filaments 52 from the plurality of material resin supply units 14 and to sequentially send out the resins obtained by fusing the filaments 52 to the mixing nozzle 104.

The mixing nozzle 104 is a member configured to mix and eject the resins supplied from the heater unit 102. As the mixing nozzle 104, a well-known small mixing nozzle can be favorably used, for example. Also, in this illustrative embodiment, the mixing nozzle 104 has a resin mixing unit 202 and a nozzle 204. The resin mixing unit 202 is a part configured to receive the resins heated by the heater unit 102. Also, in this illustrative embodiment, the resin mixing unit 202 is configured so that a diameter thereof gradually decreases towards the tip nozzle 204. For this reason, the resins supplied from the heater unit 102 are gradually mixed in the resin mixing unit 202 on a path facing towards the nozzle 204. Also, the resin mixing unit 202 is configured to thereby generate a mixed resin, which is the resin obtained by mixing the filaments 52 heated by the heater unit 102.

Also, the nozzle 204 is an opening of the resin mixing unit 202 provided at a position facing the three-dimensional object 50, and is configured to eject the mixed resin towards a position at which the three-dimensional object 50 is to be formed. Thereby, the mixed resin ejection unit 12 is configured to heat the filaments 52 in the heater unit 102, which are supplied from the plurality of material resin supply units 14. Also, the mixed resin ejection unit 12 is configured to mix the heated and fused filaments 52 in the mixing nozzle 104 just before ejecting the mixed resin from the nozzle 204 towards the three-dimensional object 50 (just before the ejection). Then, the mixed resin ejection unit 12 is configured to eject the mixed resin generated by the mixing from the nozzle 204 of the mixing nozzle 104. Also, in this case, the mixed resin ejected from the nozzle 204 with being fused is cooled and solidified by the surrounding air.

The scanning driving unit 16 is a driving unit configured to move the mixed resin ejection unit 12 relative to the three-dimensional object 50, and is configured to enable the mixed resin ejection unit 12 to perform the scanning of ejecting the fused mixed resin and moving relative to the three-dimensional object 50, thereby enabling the mixed resin ejection unit 12 to eject the mixed resin to respective parts of the three-dimensional object 50. In this case, the scanning driving unit 16 is configured to move at least one of the mixed resin ejection unit 12 and the stand unit 18, thereby enabling the mixed resin ejection unit 12 to perform the scanning.

More specifically, the scanning driving unit 16 is configured to enable the mixed resin ejection unit 12 to perform the scanning in a predetermined XY plane, in accordance with an instruction of the control unit 20, for example. The XY plane is a plane parallel with an upper surface of the stand unit 18, for example. Thereby, the scanning driving unit 16 enables the mixed resin ejection unit 12 to form one layer of a plurality of layers to be deposited so as to configure the three-dimensional object 50.

Also, the scanning driving unit 16 is configured to move the mixed resin ejection unit 12 relative to the three-dimensional object 50 in a direction of separating from the three-dimensional object 50 in a Z direction perpendicular to the XY plane, in accordance with an instruction of the control unit 20, for example, whenever the mixed resin ejection unit 12 forms one layer. Thereby, a distance between the three-dimensional object 50 and the mixed resin ejection unit 12 is adjusted to a distance for forming a next layer. By repeating the above operations, the scanning driving unit 16 enables the mixed resin ejection unit 12 to perform the scanning for forming a plurality of layers in conformity to a shape of the three-dimensional object 50 to be modeled.

The stand unit 18 is a stand-shaped member configured to hold the three-dimensional object 50 being modeled. In this illustrative embodiment, the stand unit 18 is configured to hold the three-dimensional object 50 being modeled by placing the three-dimensional object 50 on an upper surface thereof facing the mixed resin ejection unit 12.

The control unit 20 is a central processing unit (CPU) of the apparatus 10 for modeling a three-dimensional object, for example, and is configured to control operations of the respective units of the apparatus 10 for modeling a three-dimensional object, thereby enabling the apparatus 10 for modeling a three-dimensional object to model the three-dimensional object 50. Also, in this illustrative embodiment, the control unit 20 is configured to operate as a resin supply control unit, too, in accordance with a program such as the firmware, for example. In this case, the resin supply control unit has a configuration for controlling amounts of the filaments 52 that are to be supplied from each of the plurality of material resin supply units 14 to the mixed resin ejection unit 12.

More specifically, in this illustrative embodiment, the control unit 20 is configured to control amounts of the filaments 52 that are to be supplied from each of the plurality of material resin supply units 14 to the mixed resin ejection unit 12, thereby adjusting a color of the mixed resin that is to be ejected by the mixed resin ejection unit 12. In this case, for example, the control unit 20 is configured to control rotation numbers of the filament extrusion rollers 114 of the respective material resin supply units 14, thereby controlling the amounts of the filaments 52 that are to be supplied from each of the plurality of material resin supply units 14 to the mixed resin ejection unit 12. The rotation number of the filament extrusion roller 114 means a rotation number of the roller configured to extrude the filament 52 in the filament extrusion roller 114.

According to the illustrative embodiment, the modeling is performed by the fused deposition modeling method, for example, so that it is possible to appropriately model (3D model) the three-dimensional object 50 at low cost. Also, it is possible to appropriately model the colored three-dimensional object 50 by using a plurality of types of the filaments 52 of which colors are respectively different.

Also, in this illustrative embodiment, it is possible to appropriately mix the plurality of types of the filaments 52 before the ejection by using the mixed resin ejection unit 12. Also, the mixed resin obtained by the mixing is ejected, so that it is possible to appropriately model the three-dimensional object by using the mixed resin adjusted to a desired color. For this reason, according to the illustrative embodiment, for example, it is possible to appropriately express a variety of colors as regards the color of the three-dimensional object 50, without being limited to the colors of the filaments 52.

Also, as described above, in this illustrative embodiment, the control unit 20 is configured to control the amounts of the filaments 52 that are to be supplied from each of the plurality of material resin supply units 14 to the mixed resin ejection unit 12. In this case, for example, it is possible to change the color while continuing to eject the mixed resin from the nozzle 204.

More specifically, in this case, the control unit 20 is configured to control the rotation numbers of the filament extrusion rollers 114 of the respective material resin supply units 14, in accordance with color information indicating a color of the mixed resin to be ejected from the nozzle 204 at each timing, for example. Thereby, the control unit controls a pressing amount that each filament extrusion roller 114 presses the filament 52, in accordance with the color information.

According to the above configuration, it is possible to appropriately change the color of the mixed resin to be ejected. Also, in this case, since it is possible to change the color while continuing to eject the mixed resin, it is possible to prevent the modeling precision from being deteriorated due to the switch of the colors. For this reason, according to this illustrative embodiment, for example, it is possible to more appropriately model the three-dimensional object 50 colored with the diverse colors at low cost.

In the meantime, the control unit 20 is preferably configured to control the rotation numbers of the filament extrusion rollers 114, taking into consideration a time difference between the timing at which the filaments 52 are mixed and the timing at which the mixed resin is ejected from the nozzle 204. In this case, the time difference is a time difference that is to be determined depending on a capacity of the mixed resin ejection unit 12, for example.

Also, the control unit 20 may once stop the ejection in conformity to the timing at which the color of the mixed resin to be ejected from the nozzle 204 of the mixed resin ejection unit 12 is changed. Also in this case, since it is possible to perform the modeling by using the same mixed resin ejection unit 12 before and after the change of the color, it is possible to perform the modeling with higher precision, as compared to a configuration where the nozzle being used is also changed when the color is changed, for example. For this reason, also in this case, it is possible to more appropriately change the color, for example.

Here, in order to model the three-dimensional object 50 with higher precision, it is preferably to keep an ejection amount (an ejection amount per unit time) of the mixed resin, which is to be ejected from the nozzle 204 of the mixed resin ejection unit 12, to a constant ejection amount. To this end, it is also preferably to constantly keep a supply amount (a supply amount per unit time) of the filaments 52 that are to be supplied to the mixed resin ejection unit 12.

For this reason, in this illustrative embodiment, the control unit 20 is configured to control a total amount of the filaments 52, which are to be supplied from the plurality of material resin supply units 14 to the mixed resin ejection unit 12, in conformity to a preset supply amount. More specifically, when the supply and the like of the filament 52 from any one material resin supply unit 14 to the mixed resin ejection unit 12 is increased, for example, the control unit 20 decreases the supply amounts of the filaments 52 from the other material resin supply units 14, in correspondence to the increase. Also, when the supply amount of the filament 52 from any one material resin supply unit 14 is decreased, for example, the control unit 20 increases the supply amounts of the filaments 52 from the other material resin supply units 14, in correspondence to the decrease.

By the above configuration, for example, it is possible to appropriately keep the total amount of the filaments 52, which are to be supplied to the mixed resin ejection unit 12, to a constant amount. Thereby, it is also possible to more stabilize the ejection amount of the mixed resin from the nozzle of the mixed resin ejection unit 12.

Subsequently, the effects accomplished by the illustrative embodiment are described in more detail. As described above, according to the illustrative embodiment, it is possible to appropriately perform the modeling of the three-dimensional object 50 with high precision, for example. Also, it is possible to appropriately color the three-dimensional object 50 with the various colors by using the plurality of types of the filaments 52 having different colors. Also, in this case, for example, it is considered to perform the full-color coloring by using the filaments 52 of the respective colors of YMCK. Also, in this illustrative embodiment, the modeling is performed by the fused deposition modeling method, so that it is possible to appropriately suppress the cost of the apparatus, as compared to a configuration where a plurality of inkjet heads is used to perform the modeling, for example. For this reason, according to the illustrative embodiment, it is possible to appropriately provide an apparatus (full-color modeling machine) configured to perform a full-color modeling at low cost.

Also, in this illustrative embodiment, the filaments 52 of the white and clear colors are further used, in addition to the filaments 52 of the respective colors of YMCK. In this case, the filament of the white color 52 may be used to express a light color of each color, for example. Also, the filament of the white color 52 may be used to model a part for which the coloring is not performed or an inner area configuring an inside of the three-dimensional object 50, for example. Also, the filament 52 of the clear color may be used to express a transparent color. Also, the filament 52 of the clear color may be used to model a part for which the coloring is not performed or to form a transparent layer covering a surface of the three-dimensional object 50, for example. Also, for example, the filament 52 of the clear color may be used to model an inner area of the three-dimensional object 50. It is also considered to express a transparent color and a non-transparent color as regards each color by using the filaments 52 of the respective colors of YMCK and the filament 52 of the clear color.

According to this illustrative embodiment, the filament 52 except for the respective colors of YMCK is further used, so that it is possible to more appropriately color the three-dimensional object 50 with the more diverse colors. Also, as described above, in this illustrative embodiment, the filaments 52 are mixed in the mixing nozzle 104 just before the ejection from the nozzle 204. For this reason, according to the illustrative embodiment, for example, it is possible to appropriately change the color of the mixed resin to be ejected from the nozzle 204 with high readiness. Thereby, for example, it is possible to more appropriately model the three-dimensional object 50 having a high design quality. In this case, more specifically, it is considered to make a gradation expression by a plurality of colors, for example. Also, it is considered to make a drawing such as a preset drawing pattern with a resolution corresponding to the ejection precision of the nozzle 204.

Also, according to the illustrative embodiment, it is possible to make a color matching more easily and appropriately. More specifically, for example, as a method of modeling a three-dimensional object colored with a method different from the illustrative embodiment, a method of modeling a three-dimensional object colored using a binder in which a pigment is mixed with a white plaster or a resin is considered, for example. However, in this case, a color reproduction area is narrowed, so that the three-dimensional object is whitely expressed as a whole.

Also, as other methods of modeling a colored three-dimensional object, it is considered to color only a surface of the three-dimensional object with a color ink and the like, for example. In this case, however, the resolutions are different between a planar surface and an upright surface, so that it is very difficult to make a color matching.

In contrast, according to this illustrative embodiment, it is possible to sufficiently widen the color reproduction area by mixing the filaments 52 of multiple colors to express a variety of colors. Also, since the modeling is performed using the mixed resin in which the filaments 52 of multiple colors are mixed in advance, it is possible to appropriately obtain the same color, regardless of the planar surface and the upright surface. For this reason, according to this illustrative embodiment, it is possible to make the color matching more easily and appropriately. Thereby, it is also possible to more appropriately model the colored three-dimensional object 50.

Also, in this illustrative embodiment, the three-dimensional object is modeled by the fused deposition modeling method, so that it is possible to deposit the plurality of layers configuring the three-dimensional object 50. Thereby, it is also possible to appropriately increase the modeling speed. Also, in this case, the depositing speed of depositing the plurality of layers depends on the diameter of the nozzle 204 configured to eject the fused mixed resin. The diameter of the nozzle 204 can be appropriately changed by replacing the mixing nozzle 104, for example.

For this reason, in this illustrative embodiment, it is possible to perform the modeling at the various conditions by changing the diameter of the nozzle 204 and appropriately setting the supply amount of the material resin. More specifically, for example, when the nozzle 204 is made to have a small diameter, the modeling speed decreases but the higher-definition full-color modeling can be performed. Also, for example, when the nozzle 204 is made to have a large diameter, the modeling definition is lowered but the modeling speed increases. For this reason, according to this illustrative embodiment, it is possible to more appropriately model the colored three-dimensional object 50, depending on the quality and the like needed for the three-dimensional object 50. Also in this case, regarding the setting of the supply amount of the material resin, when the supply amount of the material resin from any one material resin supply unit 14 is increased, for example, the supply amounts of the material resins from the other material resin supply units 14 are preferably decreased, in correspondence to the increase. Also, when the supply amount of the material resin from any one material resin supply unit 14 is decreased, for example, the supply amounts of the material resins from the other material resin supply units 14 are preferably increased, in correspondence to the decrease. By this configuration, it is possible to appropriately set the total amount of the material resins to be supplied to the mixed resin ejection unit 12 to a predetermined supply amount.

Although the illustrative embodiment of the disclosure has been described, the technical scope of the disclosure is not limited to the illustrative embodiment. It is obvious to one skilled in the art that the illustrative embodiment can be variously changed or improved. It is clear from the claims that the changes or improvements can also be included in the technical scope of the disclosure.

INDUSTRIAL APPLICABILITY

The disclosure can be appropriately applied to the apparatus for modeling a three-dimensional object, for example.

What is claimed is:

1. A method for forming a three-dimensional object by a fused deposition modeling method, the method using:
   a plurality of material resin suppliers, each of the plurality of material resin suppliers is configured to supply a coloring material resin of a different color, and the coloring material resins are resins to be used as a modeling material; and
   a mixed resin ejector configured to shape the three-dimensional object using a mixed resin while ejecting the mixed resin, which is a resin obtained by mixing the coloring material resins that are supplied from the plurality of material resin suppliers,
   wherein the three-dimensional object is configured by stacking a plurality of layers formed by the mixed resin ejected from the mixed resin ejector,
   the plurality of material resin suppliers being configured to supply the coloring material resins of different colors to the mixed resin ejector, respectively,
   the method comprising:
   controlling amounts of the coloring material resins to be supplied from each of the plurality of material resin suppliers to the mixed resin ejector, thereby adjusting a color of the mixed resin that is to be ejected by the mixed resin ejector,
   wherein a resin supply controller is configured to control the amounts of the coloring material resins to be supplied from each of the plurality of material resin suppliers to the mixed resin ejector,
   wherein
   the resin supply controller is configured to control an ejection amount of the mixed resin to a predetermined constant amount;
   the plurality of material resin suppliers being configured to supply the coloring material resins of different colors to the mixed resin ejector based on a color information indicating the color of the mixed resin;
   the material resin of at least one of a white color or a clear color is supplied by a backup material resin supplier; and
   during the adjustment of the color of the mixed resin based on the color information,
   the backup material resin supplier is configured to additionally supply the material resin of at least one of the white color or the clear color such that the ejection amount of the mixed resin from the mixed resin ejector is the predetermined constant amount in response to detecting a total amount of the coloring material resins supplied by the plurality of material resin suppliers is less than the predetermined constant amount.

2. The method for forming a three-dimensional object according to claim 1, wherein the material resin is a thermoplastic resin,
   the mixed resin ejector comprises:
   a heater configured to heat the coloring material resins to be supplied from each of the material resin suppliers;
   a resin mixer configured to mix the coloring material resins heated by the heater, thereby generating the mixed resin; and
   a nozzle configured to eject the mixed resin generated at the resin mixer, and
   the mixed resin is ejected from the nozzle, thereby forming the three-dimensional object.

3. The method for forming a three-dimensional object according to claim 2, wherein each of the plurality of material resin suppliers has a resin extrusion device configured to extrude the material resin towards the mixed resin ejector by a roller, and wherein the resin supply controller is configured to control rotation numbers of the rollers of the resin extrusion devices of the plurality of material resin suppliers.

4. The method for forming a three-dimensional object according to claim 1, wherein the apparatus comprises the plurality of material resin suppliers configured to supply the coloring material resins of respective colors of at least yellow, magenta, cyan and black.

5. The method for forming a three-dimensional object according to claim 1, wherein the backup material resin supplier is configured to supply the material resin of the white color.

6. The method for forming a three-dimensional object according to claim 1, wherein the backup material resin supplier is configured to supply the material resin of the clear color.

7. The method for forming a three-dimensional object according to claim 1, wherein each of the plurality of material resin suppliers has a resin extrusion device configured to extrude the material resin towards the mixed resin ejector by a roller, and wherein the resin supply controller is configured to control rotation numbers of the rollers of the resin extrusion devices of the plurality of material resin suppliers.

\* \* \* \* \*